United States Patent [19]

Gesior et al.

[11] 4,359,952
[45] Nov. 23, 1982

[54] PLANTER QUICK ATTACHABLE GRANULAR CHEMICAL HOPPER ASSEMBLY

[75] Inventors: Augustyn M. Gesior, Clarendon Hills; Edward L. Robinson, Jr., Naperville, both of Ill.

[73] Assignee: International Harvester Co., Chicago, Ill.

[21] Appl. No.: 261,428

[22] Filed: May 7, 1981

[51] Int. Cl.³ .................... A01C 7/06; A01C 7/10; A01C 7/20

[52] U.S. Cl. ...................... 111/80; 111/63; 111/64; 111/65; 111/73; 222/610; 222/616; 192/23

[58] Field of Search .............. 111/63, 64, 65, 73, 111/80; 222/609, 610, 616; 192/23

[56] References Cited

U.S. PATENT DOCUMENTS

| | | | |
|---|---|---|---|
| 554,729 | 2/1896 | Reid | 111/73 |
| 2,801,030 | 7/1957 | Beck | 222/609 |
| 3,121,515 | 2/1964 | Johnson et al. | 222/610 X |
| 3,265,174 | 8/1966 | Polzin . | |
| 3,476,294 | 11/1969 | McGuffie | 222/616 |
| 3,982,670 | 9/1976 | Brass . | |

Primary Examiner—Steven A. Bratlie
Attorney, Agent, or Firm—J. J. Getchius; F. D. AuBuchon

[57] ABSTRACT

A planter having a frame, a drive train supported from the frame and having a forward end adapted to be connected to a drive and the other end having drive structure rotatably supported on the frame, the frame also having a pair of laterally spaced horizontal flanges, stop structures extending through each flange, funnel structure mounted on said frame, a clutch shaft rotatably supported in the drive structure and having spaced jaws and structure for releasably connecting the clutch shaft in a driving and non-driving position to the drive structure, a hopper assembly having lower flanged surfaces for engaging the frame flanges and stops, a granular dispenser located in the lower portion of said hopper and having a dispenser shaft engageable with the clutch shaft jaws and fastening structure between the frame and hopper for releasably attaching the hopper to the planter.

6 Claims, 5 Drawing Figures

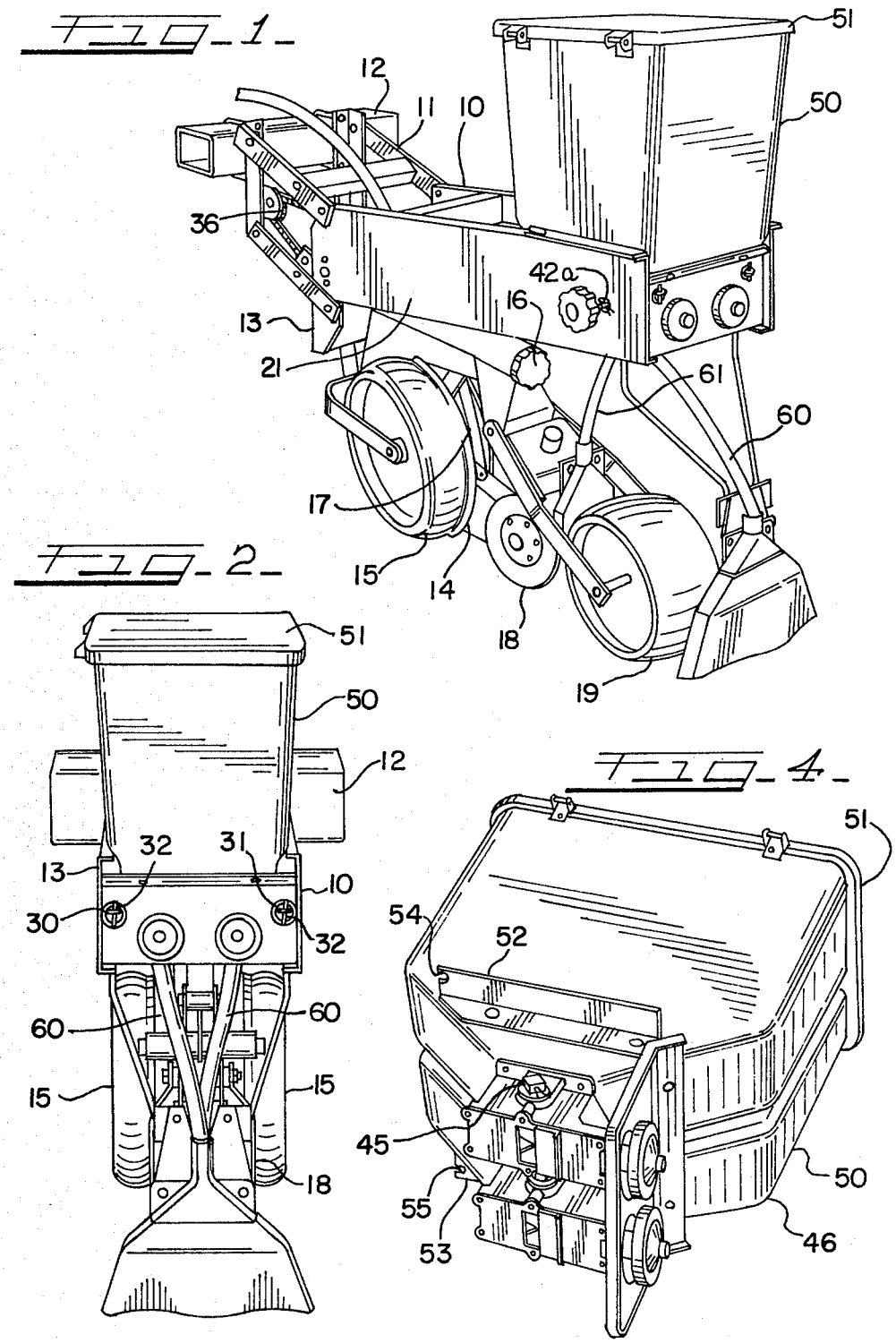

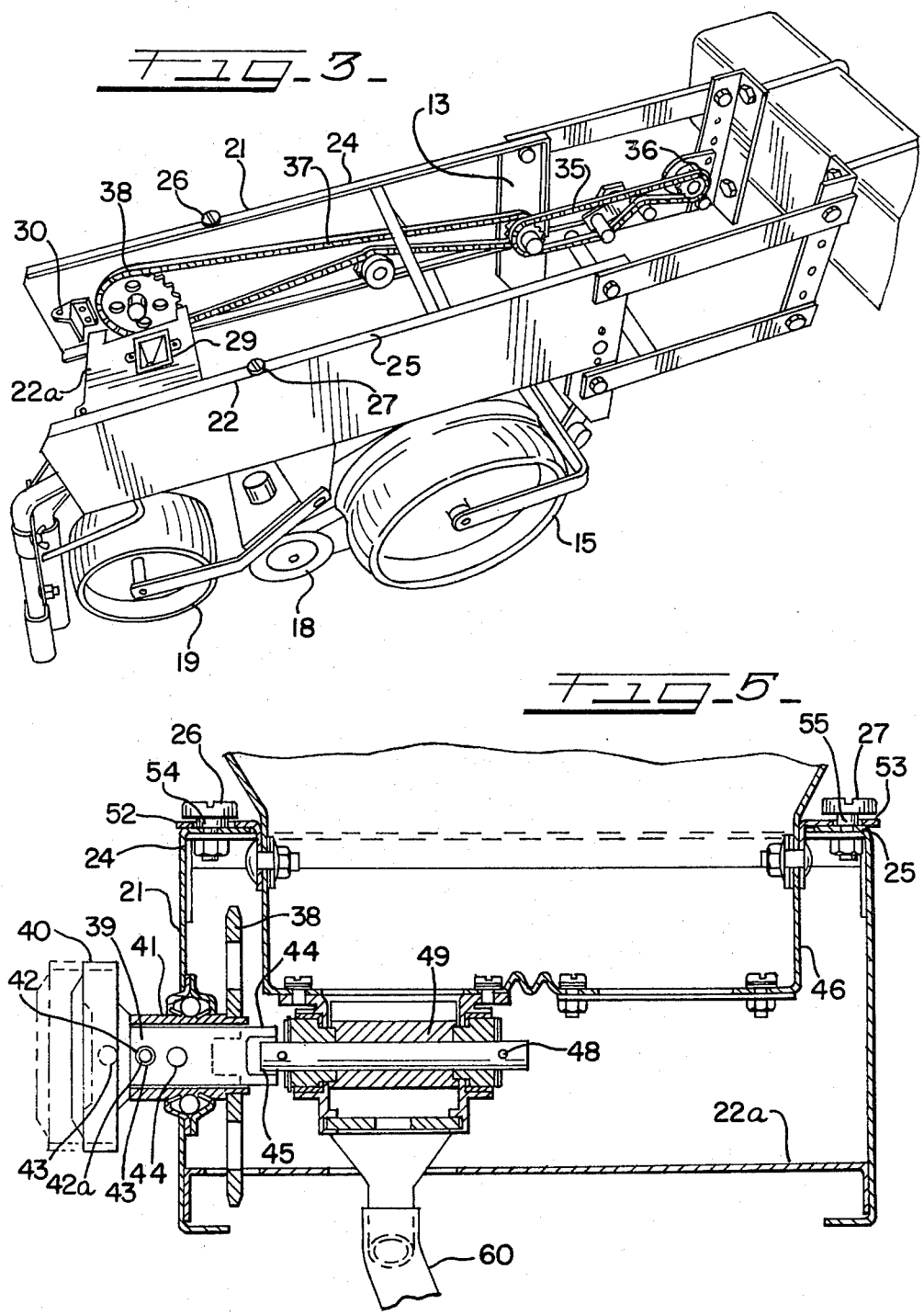

4,359,952

PLANTER QUICK ATTACHABLE GRANULAR CHEMICAL HOPPER ASSEMBLY

BACKGROUND OF THE INVENTION

1. Field of the Invention

This invention pertains generally to agricultural planting equipment and more particularly to granular chemical equipment combined therewith.

2. Description of the Prior Art

Granular chemical equipment is usually mounted rearwardly on individual drawn planters and has its dispenser or dispensers driven by a chain drive from the planter ground wheels which also drives the possible plate seed dispenser of the planter. By suitable tubes from a funnel attached to a dispenser, the chemical can be directed into the furrow or on the seed bed as desired. A rearward facing knob per dispenser when moved, varies a slide opening to vary the amount of chemical distributed as desired. Herbicides or insecticides can be distributed.

A problem has been the frequent need to empty and possibly clean hoppers so that a new substance may be used. Also, there is an occasional requirement that a dispenser itself be dismounted and cleaned. Of course, it is desired not to disturb the drive to the dispenser metering shaft thereby eliminating the need to remove and replace chains and sprockets. Further, excessive down time to accomplish the procedure is not desired. Also, the hoppers when filled may weigh more than 70 lbs., so removal and replacement must be easily accomplished.

To date, the removing of the hopper and its components without dismounting the chain drive has been generally achieved. However, the procedure is rather complicated and lengthy, and always requires the lifting and otherwise maneuvering of the usually partially filled hoppers to change chemicals being used and to clean out the hoppers and the replacement with filled hoppers. Thus, the elements could be modified to simplify the procedure and to accomplish the transfer with speed and greatly reduced effort.

SUMMARY OF THE INVENTION

Applicants, as a consequence, designed a hopper assembly structure (when combined with complementary structure on the planter row unit), that provides a quick attachable hopper assembly which reduces the time required and also the physical effort needed.

Specifically, Applicants modified the row unit granular chemical frame design to provide generally, laterally spaced elongated and horizontal flange surfaces for contact with complementary lower flanged surfaces of the hopper. Stop means located in the support frame flanged surfaces combine with rearwardly extending but forwardly opening slotted holes on the hopper, and guide and position the hopper into proper alignment as same is placed on the frame and slid forwardly into position to abut the stop means. The hopper is then aligned with a dispenser straddling the funnel supported in the planter frame, the drive clutch aligned with the hopper drive shaft, and no further forward movement is allowed of the hopper assembly on the frame flanges. The planter row unit supported drive train has a front end adapted to be connected with a central drive shaft which would be connected to all of the planter row unit drive trains. The rear or other end of the drive train has drive structure rotatably supported on said frame. A clutch shaft is provided that is rotatably supported in the drive structure and has spaced jaw structures. The clutch shaft is releasably mounted in the drive structure by a pin extending through a hole in the drive structure and one of two holes in the shaft with one hole providing the location of the jaws in the driving position and the other hole a non-driving position. The frame also has possibly two or less rearward tabs with holes extending therethrough. The hopper assembly complementary lower flanges engage the frame flanges and if the jaw structures are in the non-driving position, the hopper assembly can be slid forwardly without supporting same until the slotted holes encounter the stop means and are then guided until stopped by the stop means with a funnel aligned with the dispenser. At this point also, the tabs enter through slots in the rear hopper assembly structure and fasteners hold the hopper assembly rigidly in position preventing especially rearward movement. With the clutch shaft pin removed and the shaft moved inwardly and rotated until the jaws engage the square shaft of the dispenser and the pin reinserted, the granular distributor is ready for use. Flow from a dispenser can be adjusted by rotating the suitable control knob. Tubes connected to the funnel direct the chemical where desired. If two dispensers are utilized, the second metering shaft is aligned and releasably connected to the first, and also driven by the clutch shaft.

Removal of the hopper assembly can be quickly made by removing one fastener or two fasteners, if utilized, which may be klik pins and disengaging the clutch shaft by pulling the pin and moving the shaft laterally outward and reinstalling the pin in the disengaged position. The entire hopper assembly can now be merely slide rearwardly until free of the planter without supporting same. The rotor for each dispenser can also easily be removed by taking out a cotter pin and hence the shaft and then the rotor.

It is therefore an object of this invention to provide a new and improved quick attachable granular chemical hopper assembly.

Another object is to provide a hopper assembly that when installed on a planter row unit has all elements automatically aligned and ready to be connected to the planter drive for operation.

Another object is to provide a hopper assembly metering shaft and a clutch shaft arrangement that can be quickly connected and disconnected to the drive train when mounted on the planter row unit.

BRIEF DESCRIPTION OF THE DRAWINGS

FIG. 1 is a left side perspective view of a planter and the quick attachable granular chemical hopper incorporated therewith;

FIG. 2 is a rear view of the device of FIG. 1;

FIG. 3 is a perspective right side view of the planter with the hopper and other elements removed therefrom;

FIG. 4 is a perspective left side view of the hopper assembly; and

FIG. 5 is a sectional elevational view of a single hopper dispenser and the drive therefor.

DESCRIPTION OF THE PREFERRED EMBODIMENT

Referring to FIGS. 1, 2 and 3, 10 indicates a planter row unit assembly. Planter row unit assembly 10 includes a parallel link construction 11 for attachment to a tractor drawn tool bar 12. Planter row unit assembly 10 also includes a frame 13 for support of the conventional planter row unit components. Supported on frame 13 for rotation are dual disk furrow openers 14 and laterally spaced gauge wheels 15 pivotally supported from frame 13 for regulating furrow depth via threaded adjustment 16. Seed tube 17, which may be connected to an air dispenser or a plate dispenser, extends toward the furrow created by the disks. Furrow closing disks 18 close the furrow over the seed and presswheel 19 firms the soil over the seed to eliminate air pockets and create the seed bed profile.

Also, a part of frame 13 is structure associated with the later to be described granular chemical hopper assembly and also shown in FIG. 3. This structure (frame) includes left side sheet 21 and right hand sheet 22 having top flanges 24 and 25 respectively. A shouldered capscrew 26 extends through flange 24 and a shouldered capscrew 27 extends through flange 25 providing space between the flanges and capscrew heads. Attached to side sheets 21 and 22 is tie sheet 22a. Funnel 29 is mounted on tie sheet 22a. Dual funnels may be utilized if desired for dual dispensers as shown in FIG. 4. Mounted on side sheet 21 rearward of funnel 29 is tab 30 having an opening therethrough. A second tab 31 may be used as shown in FIG. 2. Klik quick attachment pins 32 fasten the tabs to the later to be described hopper assembly. Mounted for support on side sheet 21 and support 13 is drive train 35. Drive train 35 has sprocket 36 adapted to be engaged and driven by a central shaft driven by a ground engaging wheel and extending transverse to the tool bar to drive all like supported planter row units. Sprocket 36 via chain 37 via suitable idlers drives sprocket 38 rotatably supported on sheet 21.

As shown in FIG. 5, sprocket 38 is disclosed in detail and its rotational mounting in sheet 21. Clutch shaft 39 having a knob 40 rigidly attached thereto extends through an opening in sleeve 41 fixed to sprocket 38. Sleeve 41 has one hole 42 therethrough that is alignable as desired with two holes 43 and 44 in shaft 39. Pin 42a when installed in either hole maintains the lateral position of shaft 39 in sleeve 41. Shaft 39 also has a pair of jaws 44 that engage a suitable square shaft 45 in hopper assembly 46. It can be seen that when pin 42a is withdrawn and shaft 39 and jaws 44 are withdrawn from the driving position with shaft 45 and pin 42a placed in hole 44 and 42, that shaft 39 will not drive shaft 45. Also with the jaws withdrawn, shaft 45 and the balance of hopper assembly 46 is unaffected when being assembled or disassembled.

Also to be noted is that if cotter pin 48 is withdrawn, shaft 45, (with the hopper assembly out of the frame assembly), can be withdrawn and the rotor 49 can be removed and the dispenser cleaned.

Hopper assembly 46 includes plastic shell 50 which may be divided into two compartments both of which are enclosed by lid 51. Hopper assembly 46 is shown separately in FIG. 4. Hopper assembly has lower flanges 52 and 53 which are designed to be complementary to side sheet flanges 24 and 25 respectively. Also noted are front opening slotted holes 54 and 55 which are designed to be guided into contact with capscrews or stops 26 and 27. Flanges 52 and 53 may be adjustable fore and aft to insure alignment when holes 54 and 55 contact stops 26 and 27. It is only in this limited range that the dispenser aligns laterally with the funnel 29 and the clutch shaft 39 with shaft 45. The funnel may have tube 60 that extends rearwardly to cover the unenclosed seed or 61 forwardly to cover unclosed seed or directed into the furrow depending on the chemical used.

In operation, with the planter row unit assembly 10 shown in FIGS. 1 and 2, in the planting position, if it is desired to change chemicals, the two klik pins 32 are removed and the pin 42a withdrawn. Thereby pulling on knob 40 outwardly causes shaft 39 and jaws 44 to be disengaged from shaft 45 and also to be moved out of the way of same. The entire hopper assembly 46 can now be slid rearwardly with the weight resting on flanges 24 and 25 of the frame.

To reinstall the hopper assembly 46, a reverse procedure is followed. The hopper assembly 46 is merely placed so that flanges 52 and 53 rest on flanges 24 and 25 of frame assembly 10 and the assembly pushed virtually in all the way until the slotted holes 54 and 55 approach stop means 26 and 27 respectively. Here the hopper assembly 46 is straightened so funnel 29 is aligned with the dispenser housing and the rear of the hopper assembly 46 with tabs 30 and 31. The hopper assembly is continued to be pushed forward until the slots 54 and 55 contact the stop means 26 and 27 and klik pins 32 inserted to secure the hopper assembly to the frame. Clutch shaft 39 upon removal of pin 42a is pushed in and rotated until jaws 44 mate with shaft 45 and pin 42a installed in hole 43 and hole 42 to maintain the engaged meter shaft position for field work.

As is evident, the procedure for removing and replacing the granular chemical hopper can be quickly accomplished by the provided structure with a minimum of effort with the lifting normally required severely reduced.

What is claimed is:

1. In a planter row unit assembly having a frame adapted to be connected to a source of power for towing, a drive train supported from said frame and having a forward end adapted to be connected to a drive and another end having drive structure rotatably supported on said frame, wherein the improvement comprises:
said frame having a pair of laterally spaced, elongated generally horizontal flanges, stop means extending through each flange, funnel structure supported on said frame, a clutch shaft rotatably supported in said drive structure, and having spaced jaw structure, means for releasably connecting said clutch shaft in a shaft driving and non-driving position to said drive structure and including a hole extending through said drive structure and a pair of laterally spaced holes in said clutch shaft and a pin engageable with said structure and shaft holes for securing the desired shaft driving position wherein the shaft is extended laterally and the non-driving position wherein the shaft is retracted, a hopper assembly having lower flanged surfaces for engaging said frame flanges and said stop means, and a granular dispenser located in the lower portion of said hopper assembly and having a shaft formed to engage said spaced jaw structure of said clutch shaft in a driving position, said funnel structure being alignable with said dispenser, and fastening means extending between said frame and said hopper assembly for releasably attaching said hopper assembly to said planter assembly.

2. The assembly of claim 1 in which said dispenser shaft, clutch shaft and funnel structure are laterally aligned.

3. The assembly of claim 2 in which said hopper assembly flanged surfaces have forwardly located rearwardly slotted holes for guiding said hopper assembly forwardly into longitudinal alignment with said stop means and thus said funnel structure alignment with said dispenser.

4. The assembly of claim 3 in which said frame has at least one apertured tab that extends through an opening in a hopper assembly rear surface to align said hopper assembly and said fastening means secures said hopper assembly to said tab.

5. The assembly of claim 4 in which a pair of rearwardly located and laterally spaced quickly attachable fastening means are utilized to releasably fasten said hopper assembly to said frame via a pair of frame tabs.

6. The assembly of claim 5 further comprising tube structure connectable to the funnel structure for depositing chemicals in a furrow or on a seed bed.

* * * * *